US011151879B2

(12) United States Patent
Strunck et al.

(10) Patent No.: US 11,151,879 B2
(45) Date of Patent: Oct. 19, 2021

(54) COMMUNICATION DEVICE, METHOD FOR EXECUTION BY A COMMUNICATION DEVICE, AND METHOD FOR IMPROVING TRAFFIC SAFETY OF A ROAD USER

(71) Applicants: Continental Teves AG & Co. oHG, Frankfurt am Main (DE); Continental Automotive Systems, Inc., Auburn Hills, MI (US)

(72) Inventors: Sebastian Strunck, Niedernhausen (DE); Ulrich Stählin, Rochester, MI (US)

(73) Assignees: CONTINENTAL TEVES AG & CO. OHG, Frankfurt am Main (DE); CONTINENTAL AUTOMOTIVE SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 16/679,735

(22) Filed: Nov. 11, 2019

(65) Prior Publication Data
US 2021/0142675 A1    May 13, 2021

(51) Int. Cl.
*G08G 1/16* (2006.01)
*H04W 4/40* (2018.01)

(52) U.S. Cl.
CPC .............. *G08G 1/166* (2013.01); *H04W 4/40* (2018.02)

(58) Field of Classification Search
CPC .......... G08G 1/166; G08G 1/00; G08G 1/161; H04L 67/12; H04L 67/322; H04L 69/14; H04W 4/40
USPC ....................................................... 340/902
See application file for complete search history.

(56) References Cited

U.S. PATENT DOCUMENTS

| | | | |
|---|---|---|---|
| 6,429,790 B1 | 8/2002 | Frese et al. | |
| 8,547,249 B2 | 10/2013 | David et al. | |
| 10,235,882 B1 * | 3/2019 | Aoude | G08G 1/0137 |
| 2013/0281141 A1 * | 10/2013 | Rubin | H04W 4/06 |
| | | | 455/500 |

(Continued)

FOREIGN PATENT DOCUMENTS

| | | | |
|---|---|---|---|
| DE | 102008049824 A1 | 4/2010 | |
| DE | 102014219165 A1 | 1/2016 | |

(Continued)

OTHER PUBLICATIONS

International Search Report and Written Opinion for International Application No. PCT/EP2020/079049, dated Dec. 2, 2020, 13 pages (German).

*Primary Examiner* — Emily C Terrell
(74) *Attorney, Agent, or Firm* — RatnerPrestia

(57) ABSTRACT

A communication device including a mobile radio module for data communication via a mobile radio network and/or an internet access module for data communication via the internet, and a radio module for direct vehicle-to-X communication. The communication device is configured to receive status information and/or environment information of a road user from a processing device for operation of an internet service by the mobile radio module and/or internet access module and to re-emit the status information and/or environment information via the radio module by direct vehicle-to-X communication. A corresponding method to be carried out by a communication device and a method for improving the road safety of a road user are also disclosed.

2 Claims, 3 Drawing Sheets

(56) References Cited

U.S. PATENT DOCUMENTS

| | | | |
|---|---|---|---|
| 2015/0109148 A1* | 4/2015 | Cheatham, III | G01S 7/4804 340/944 |
| 2017/0287332 A1 | 10/2017 | Ranninger Hernandez et al. | |
| 2017/0372612 A1* | 12/2017 | Bai | G08G 1/161 |
| 2018/0165976 A1* | 6/2018 | Mahnke | G08G 1/005 |
| 2018/0295481 A1* | 10/2018 | Kahtava | H04W 4/40 |
| 2019/0059019 A1* | 2/2019 | Wallentin | H04W 40/12 |
| 2019/0110175 A1* | 4/2019 | Chun | H04W 4/40 |
| 2019/0116467 A1* | 4/2019 | Belleschi | H04B 7/0626 |
| 2019/0174344 A1* | 6/2019 | Karella | H04L 43/062 |
| 2019/0253852 A1 | 8/2019 | Boström et al. | |
| 2019/0268447 A1* | 8/2019 | Yang | H04W 4/40 |
| 2020/0245103 A1* | 7/2020 | Lee | H04W 4/44 |

FOREIGN PATENT DOCUMENTS

| | | |
|---|---|---|
| DE | 102016217531 A1 | 3/2018 |
| DE | 102016217532 A1 | 3/2018 |
| WO | 9963502 A2 | 12/1999 |

* cited by examiner

COMMUNICATION DEVICE, METHOD FOR EXECUTION BY A COMMUNICATION DEVICE, AND METHOD FOR IMPROVING TRAFFIC SAFETY OF A ROAD USER

FIELD OF THE INVENTION

The present invention relates to a communication device, to a corresponding method to be carried out by a communication device and to a method for improving the road safety of a road user.

BACKGROUND OF THE INVENTION

Vehicle-to-X communication (V2X communication) has major potential for improving road traffic safety. The more participants participate in this communication network, the safer the environment can be made, in particular with regard to the communication participants. In particular for pedestrians and cyclists, there are currently no, or no comparably capable, technical solutions for V2X communication as are available for example for vehicles. It is already known to equip such "vulnerable road users" (VRU) with appropriate mobile radio devices which support vehicle-to-X communication.

Mobile radio devices of this kind, such as for example smartphones or dedicated transponders, are dependent on the performance of their batteries, the use of V2X communication entailing considerable energy consumption, if, for the purposes of VRU safety, continuous communication is to be ensured and whereby the safety of the vulnerable road user may possibly be limited if the mobile radio device can no longer be supplied with power due to the limits of energy storage capacity. It might also happen that the vulnerable road user does not immediately recognize this situation.

SUMMARY OF THE INVENTION

An aspect of the invention aims to improve the safety of a vulnerable road user in road traffic.

An aspect of the invention describes a communication device comprising a mobile radio module for data communication via a mobile radio network and/or an internet access module for data communication via the internet, and a radio module for direct vehicle-to-X communication, wherein the communication device is configured to receive status information and/or environment information of a road user by means of the mobile radio module and/or the internet access module from a processing device for operation of an internet service and to re-emit the status information and/or environment information via the radio module by means of direct vehicle-to-X communication, in particular for receipt by further road users, for example vehicles.

Mobile devices to be carried by vulnerable road users, such as for example smartphones, smartwatches, laptops, tablets, or bicycles, are nowadays frequently equipped with at least one mobile radio module. An aspect of the invention is based on the concept of providing identified status information, for example position or direction information, and/or environment information of a road user who, while indeed having a mobile radio module, does not have a communication device designed for direct vehicle-to-X communication, to a processing device for operation of an internet service which in turn transfers this information to a communication device of a corresponding area-specific communication network in which the road user is located, by means of mobile radio or internet. Via the communication device, the road user information may in turn be distributed by means of direct vehicle-to-X communication to further road users located in the area and/or this information may be used to avoid safety-critical traffic situations by appropriate measures being taken. The further road users who do not have a mobile radio module and/or an internet access module but do instead have a radio module for direct vehicle-to-X communication, thus nevertheless receive information about the road users who do not have a radio module for direct vehicle-to-X communication.

Communication which transcends radio systems and combines the short-range communication of direct vehicle-to-X communication, in particular of further road users, with the long-range communication of the road user which makes use of mobile radio is thus achieved. The communication device thus serves as a proxy between the various communication technologies. Furthermore, mobile devices which are already commercially available, inasmuch as they have a mobile radio apparatus, can also be included in V2X communication and so in particular also be used to protect VRUs. Accordingly, the mobile devices also need not necessarily be equipped with V2X radio modules for direct V2X communication, whereby the additional energy requirement for the mobile device in question is moreover reduced.

Direct V2X communication should in particular be taken to mean direct communication between road users which does not require a mobile radio network for said communication. Protocols or standards used for this purpose are for example "PC5" or "directlink", which are in particular defined in the 5G standard, or IEEE 802.11p or ITS-G5.

In addition to a mobile radio module, mobile devices to be carried in particular by vulnerable road users frequently also comprise a receiver for a global navigation satellite system (GNSS). Bicycles are also already equipped or can be retrofitted with comparable systems. Corresponding position and/or direction information can be provided by means of a GNSS receiver as status information of the road user. According to a further development, in particular the position and/or direction information of the road user or of the carried mobile device may, independently of an optionally present GNSS receiver, also be detected by location-finding methods using the mobile radio network. Location finding by means of the mobile radio network may contribute to improving privacy and, since no information need be provided by the mobile device itself, energy efficiency can be further increased. If identification is carried out by the network, it additionally makes good sense to use the communication which in any event proceeds between the mobile radio module of the mobile device and the network infrastructure and so require no additional functionality in the mobile radio device. It would thus be possible to offer the detection of road user status information as a purely network functionality. In addition to the already stated position and/or direction information, further road user status information may be for example speed information, trajectory information, location information and/or movement pattern information.

Furthermore, environment information of the road user can be transmitted to the processing device. This information may for example comprise object information detected by means of environment sensors. This enables the transfer of additional information for example with regard to further road users detected by sensor means.

According to a further development, the communication device is included in a vehicle, a roadside unit (RSU), an infrastructure apparatus or a mobile device. If the communication device is included in a vehicle, the information received by the road user may, according to a further development, additionally be transferred to an evaluation apparatus of the vehicle in order to identify a potential safety-critical traffic situation. If a safety-critical traffic situation, such as for example a probable collision with the road user providing the status information, is identified, the evaluation apparatus is in particular configured to take measures to avoid the safety-critical situation.

According to one embodiment, the communication device is configured to emit status information and/or environment information and/or notification information with regard to a further road user by means of the mobile radio module and/or the internet access module for receipt by the road user. Advantageously, status information and/or environment information and/or notification information with regard to at least one further road user may be transferred by means of the mobile radio module to the road user to protect, warn or inform him/her in response to the receipt of his/her status and/or environment information. A road user who is not carrying a communication device for direct V2X communication may thus nevertheless be provided with safety-relevant information. According to a further development, the communication device is accordingly configured to detect the status information and/or environment information and/or notification information with regard to a further road user for emission to the road user. As has already been described for the road user, the status information and/or environment information may in comparable manner be detected by the communication device or an electronic apparatus comprising same. Notification information, for example warnings, for transmission to the road user can furthermore also be derived on the basis of the detected information.

According to a further development, the communication device is configured to transmit the status information and/or environment information and/or notification information with regard to the further road user to the processing device for receipt by the road user. It may accordingly be provided that the processing device communicates the information to the road user.

According to a further development, the communication device is configured to emit the status information and/or environment information of the road user by means of the radio module for direct vehicle-to-X communication included in a Cooperative Perception Message (CPM) and/or a Cooperative Awareness Message (CAM) and/or a Basic Safety Message (BSM). The CPM and the CAM are standardized in line with ETSI specifications and the BSM in line with the SAE specification.

In a further development of the stated communication device, the stated device has a memory and a processor. In this way, the stated method is saved in the memory in the form of a computer program and the processor is provided to carry out the method when the computer program is loaded from the memory into the processor.

According to a further aspect of the invention, a computer program comprises program code means for carrying out all the steps of one of the stated methods when the computer program is run on a computer or one of the stated devices.

According to a further aspect of the invention, a computer program product contains program code which is stored on a computer-readable data storage medium and which, when run on a data processing apparatus, performs one of the stated methods.

The vehicle may be a motor vehicle, in particular a private vehicle, a truck, a motorcycle, an electric vehicle or a hybrid vehicle, a watercraft or an aircraft.

An aspect of the invention furthermore relates to a method to be carried out by a communication device, in particular according to an embodiment of the communication device of an aspect of the invention, comprising the steps of:

receipt of status information and/or environment information of a road user from an emitting processing device for operation of an internet service by means of a mobile radio module for data communication via a mobile radio network and/or of an internet access module for data communication via the internet, and emission of the status information and/or environment information of the road user by means of a radio module for direct vehicle-to-X communication.

Additional advantageous further developments of the method are apparent from the previously described embodiments of the communication device according to aspects of the invention.

An aspect of the invention furthermore relates to a method for improving the road safety of a vulnerable road user comprising the steps of:

emission of status information and/or environment information of a road user by means of a first mobile radio module for data communication via a mobile radio network for receipt by a processing device for operation of an internet service, wherein the first mobile radio module is included in a device carried by the road user, receipt of the status information and/or environment information of the road user from the processing device by means of a second mobile radio module for data communication via a mobile radio network and/or an internet access module for data communication via the internet, wherein the second mobile radio module and/or the internet access module is included in a communication device according to at least one of claims 1 to X, emission of the status information and/or environment information of the road user by means of a radio module for direct vehicle-to-X communication of the communication device, in particular for receipt by further road users.

Dedicated application software installable on a mobile device of the road user for communication with the processing device may in principle be provided for implementation. Alternatively, this function may also be implemented as part of a navigation software product, such that, in addition to position information, approximated "trajectories" for the purpose of maneuver coordination (Maneuver Coordination Message) can also be generated and emitted on the basis of the route directions.

Using corresponding application software, the road users concerned could add themselves to this network and so contribute to road traffic safety. Bicycles with appropriate hardware could already today participate in this network without there being any need to provide specific radio modules for direct V2X communication. In the case of an embodiment in which the status information is detected by means of the mobile radio network infrastructure, for example by triangulation, there is no need for additional hardware or software for the road user's mobile device.

BRIEF DESCRIPTION OF THE DRAWINGS

Certain particularly advantageous configurations of aspects of the invention are indicated in the subclaims. Further preferred embodiments are also apparent from the following description of exemplary embodiments made with reference to figures, in which in schematic representation:

DETAILED DESCRIPTION OF THE PREFERRED EMBODIMENTS

Figure 1:
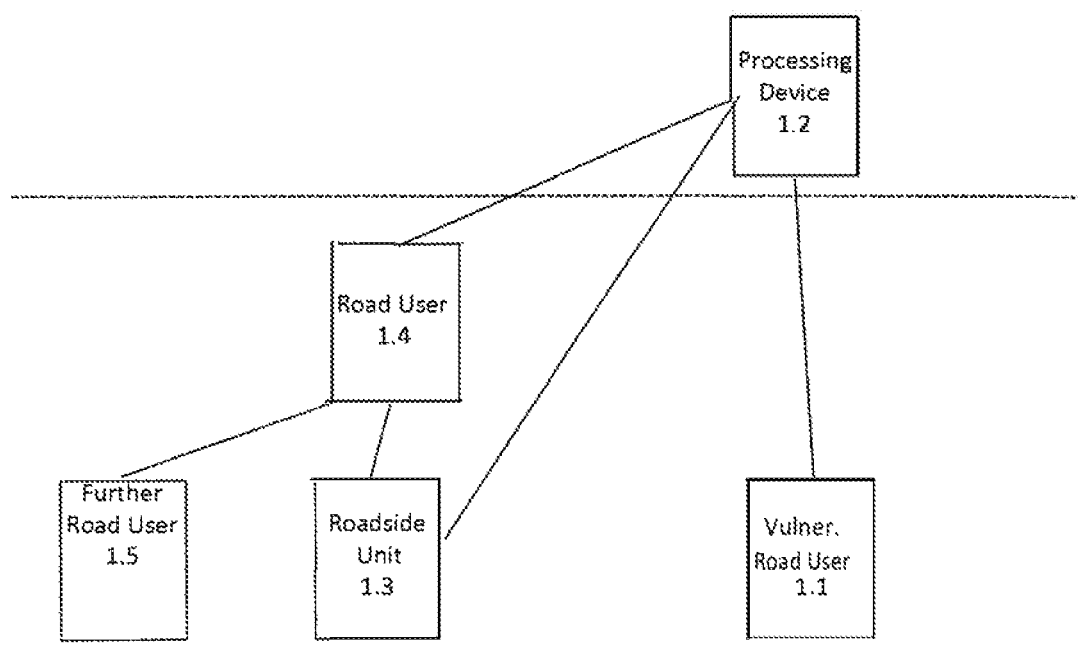
FIG. 1 shows a block diagram to explain the concept underlying an aspect of the invention

FIG. 1 shows a communication concept which underlies an aspect of the invention, wherein a mobile device carried by a vulnerable road user 1.1 (VRU), said device comprising a mobile radio module ("Network Access Device" or NAD), transfers via mobile radio at least one item of position information to a processing device 1.2, for example for operating an internet service. The mobile device here does not comprise a radio module for direct vehicle-to-X communication or said radio module cannot be used, for example because it is disabled. Communication pathways are shown by continuous lines, the dashed line shown in FIG. 1 symbolizing the distinction between mobile radio communication (communication pathways which cross the line) and direct V2X communication or short-range communication in which the communication pathways do not intersect with the dashed line.

The processing device 1.2 selects, at least on the basis of the transferred position information, a communication device of a roadside unit (RSU) 1.3 which is located at the least possible distance from the position information and is configured for V2X communication for receipt of the position information of the VRU. In principle, the roadside unit 1.3 may here be associated with a specific infrastructure apparatus, such as for example traffic lights, a junction or a street. Alternatively or in addition, a communication device of a road user 1.4 may also be selected for receipt of the position information of the VRU. Emission and receipt here proceeds by transfer via a mobile radio network, wherein the RSU 1.3 or the road user 1.4 have a corresponding mobile radio module.

After receipt and optional further processing or filtering by the communication device of the RSU 1.3 and/or the road user 1.4, the position information is emitted by means of direct V2X communication for receipt by at least one further road user 1.5. The V2X communication is conventionally an emission in broadcast mode, such that the emitted position information is also receivable, depending on the particular transmitter, by the RSU 1.3 and/or road user 1.4. Road users thus receive the position information irrespective of whether they do or do not have a mobile radio module.

Figure 2:
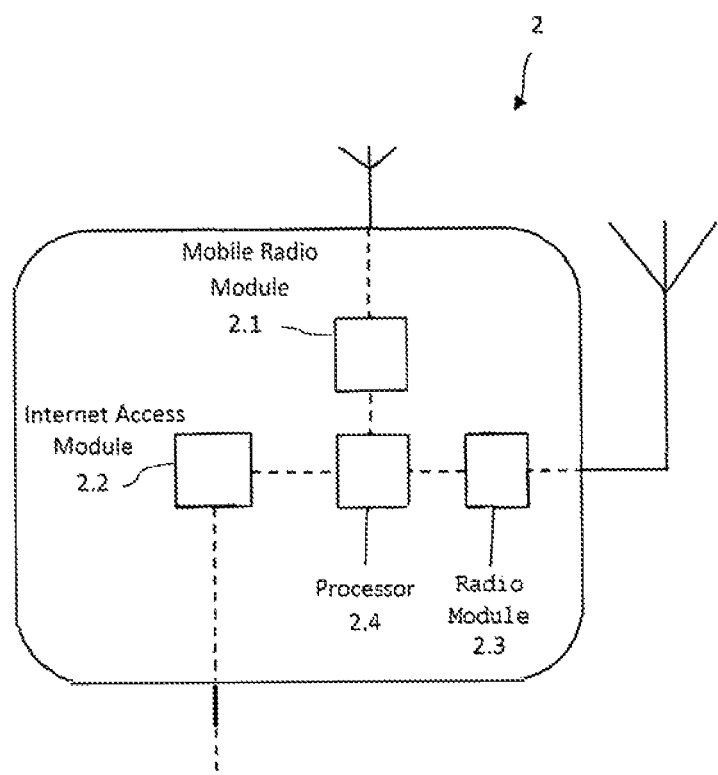
FIG. 2 shows an exemplary embodiment of the device for vehicle-to-X communication according to an aspect of the invention comprising an exemplary embodiment of the verification apparatus according to an aspect of the invention and FIG. 3 shows an exemplary embodiment of the method for improving the road safety of a road user according to an aspect of the invention.

FIG. 2 shows exemplary embodiment of the communication device 2 according to an aspect of the invention comprising a mobile radio module 2.1 for data communication via a mobile radio network and/or an internet access module 2.2 for data communication via the internet and a radio module 2.3 for direct vehicle-to-X communication. The communication device may furthermore have a processor 2.4 for data processing. The communication device is configured to receive status information and/or environment information of a road user from a processing device for operation of an internet service by means of the mobile radio module 2.1 and/or internet access module 2.2 and to re-emit the status information and/or environment information via the radio module 2.3 by means of direct vehicle-to-X communication, in particular for receipt by further road users.

Figure 3:
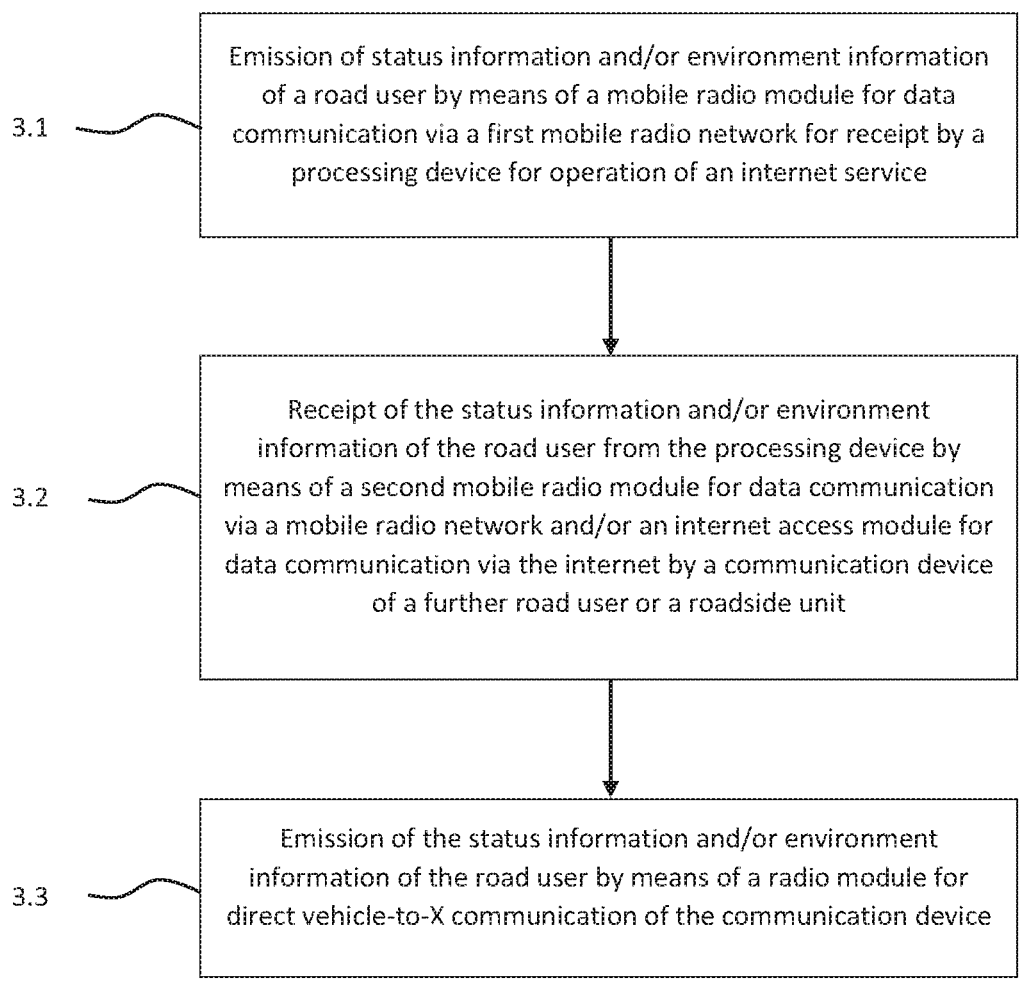

FIG. 3 shows an exemplary embodiment of the method for improving the road safety of a road user according to an aspect of the invention in the form of a sequence diagram. In a step 3.1, status information and/or environment information of a road user is emitted by means of a mobile radio module for data communication via a first mobile radio network for receipt by a processing device for operation of an internet service. The first mobile radio module is here included in a device carried by the road user. In a step 3.2, the status information and/or environment information of the road user from the processing device is received by means of a second mobile radio module for data communication via a mobile radio network and/or an internet access module for data communication via the internet by a communication device of a further road user or a roadside unit (RSU). In a step 3.3, the status information and/or environment information of the road user is emitted by means of a radio module for direct vehicle-to-X communication of the communication device, in particular for receipt by further road users.

In general, it should be noted that direct vehicle-to-X communication is in particular taken to mean direct communication between vehicles and/or between vehicles and infrastructure apparatuses. For example, it may thus be vehicle-to-vehicle communication or vehicle-to-infrastructure communication. If, in the context of this application, reference is made to communication between vehicles, this may in principle proceed for example in the context of vehicle-to-vehicle communication, which proceeds without mediation by a mobile radio network or a similar external infrastructure and which may therefore be distinguished from other solutions which are based for example on a mobile radio network. For example, vehicle-to-X communication may proceed on the basis of standards IEEE 802.11p or IEEE 1609.4 or 5G PC5 or sidelink. Vehicle-to-X communication may also be described as C2X communication or V2X communication. The sub-categories may be described as C2C (car-to-car) and V2V (vehicle-to-vehicle) or C2I (car-to-infrastructure) and V2I (vehicle-to-infrastructure).

The invention claimed is:

1. A method to be carried out by a communication device comprising:

receipt from an emitting processing device for operation of an internet service of at least one of status information and environment information of a road user using at least one of a mobile radio module for data communication via a mobile radio network and an internet access module for data communication via the internet, the received at least one of the status information and the environment information of the road user originating from a device carried by the road user, the device lacking capability for direct vehicle-to-X communication;

emission of the at least one of status information and environment information of the road user by a radio module for direct vehicle-to-X communication to at least one further road user in response to obtaining at least one of status information and environment information of the at least one further road user;

identification of notification information for transmission to the road user based on the at least one of status information and environment information of the road user; and transmission of the identified notification information to the road user by the at least one of the mobile radio module for data communication via the mobile radio network and the internet access module for data communication via the internet.

2. A method for improving the road safety of a road user comprising:

emission of status information and/or environment information of a road user by a first mobile radio module for data communication via a mobile radio network for receipt by a processing device for operation of an internet service, wherein the first mobile radio module is included in a device carried by the road user, the device lacking capability for direct vehicle-to-X communication;

receipt from the processing device for operation of the internet service at least one of the status information and environment information of the road user using at least one of a second mobile radio module for data communication via a mobile radio network and an internet access module for data communication via the internet by a communication device of a further road user or of a roadside unit;

emission of the at least one of status information and environment information of the road user by a radio module for direct vehicle-to-X communication of the communication device to at least one further road user in response to obtaining at least one of status information and environment information of the at least one further road user;

identification by the communication device of notification information for transmission to the road user based on the status information and/or environment information of the road user; and transmission of the identified notification information by the communication device to the road user by the at least one of the second mobile radio module for data communication via the mobile radio network and the internet access module for data communication via the internet.

* * * * *